United States Patent Office 3,410,886
Patented Nov. 12, 1968

3,410,886
Si-H TO C=C OR C≡C ADDITION IN THE PRESENCE OF A NITRILE-PLATINUM (II) HALIDE COMPLEX
John R. Joy, Grand Island, N.Y., assignor to Union Carbide Corporation, a corporation of New York
No Drawing. Filed Oct. 23, 1965, Ser. No. 504,051
8 Claims. (Cl. 260—448.2)

This invention relates to a process for the production of organo-silicon compounds. More particularly, this invention relates to a process employing an improved catalyst for the reaction between a compound containing a silicon-bonded hydrogen atom and an aliphatic unsaturated organic compound whereby a silicon-carbon bond is formed.

Reactions between compounds containing silicon-bonded hydrogen atoms and aliphatic unsaturated organic compounds are known. The products of such reactions can be monomeric or polymeric and are useful as coating materials, insulating materials, elastomers, etc. The products are also useful as intermediates in the preparation of more complex organosilicon compounds.

These aforementioned reactions usually are carried out in the presence of a catalyst. While many catalysts are known in the art for bringing about these reactions, generally favored as catalysts are platinum-olefin and platinum-cycloalkane complexes since they are readily soluble in commonly employed solvents and are relatively less susceptible to catalyst poisoning.

There exists a drawback for such catalysts, however, since they are subject to decomposition by reaction with moisture in the atmosphere.

It is the principal object of this invention to provide a process for reacting an organosilicon compound containing silicon-bonded hydrogen with an aliphatic unsaturated organic compound by means of a platinum complex type catalyst which does not suffer from the aforementioned drawbacks.

Still other objects will readily present themselves to the skilled artisan upon reference to the ensuing specification and the claims.

The foregoing objects are achieved by the process of this invention wherein a silicon compound containing at least one hydrogen atom attached to a silicon atom per molecule, but having not more than two hydrogen atoms attached to any silicon atom in the molecule, is reacted with an aliphatic organic compound having carbon-to-carbon unsaturation, but free from other functional groups reactive toward ≡SiH, in the presence of catalytic amounts of a platinum (II) halide complex, an alkyl nitrile-platinum (II) halide complex, an alkaryl nitrile-platinum (II) halide complex, an aralkyl nitrile-platinum (II) halide complex or a haloaryl nitrile-platinum (II) halide complex.

While in the aforementioned platinum (II) complexes any halide is operable, the preferred halides are the chlorides. Similarly, while the hydrocarbyl or halohydrocarbyl nitrile-platinum (II) halide complexes enumerated above can contain any number of carbon atoms in their respective hydrocarbon portions, up to about 18 carbon atoms are preferred.

Illustrative in the foregoing are bis(benzonitrile)dichloroplatinum (II), bis(2 - naphthonitrile)dichloroplatinum (II), bis(acetonitrile)dichloroplatinum (II), bis-(butyronitrile)dichloroplatinum (II), bis(lauronitrile)dichloroplatinum (II), bis(ethylbenzonitrile)dichloroplatinum (II), bis(phenylbutyronitrile) - dichlorplatinum (II), bis(phenylmyristonitrile)dichloroplatinum (II), bis(4-chlorobenzonitrile)dichloroplatinum (II), and the like.

The term "catalytic amount" as used herein and in the appended claims is taken to mean an amount which is at least sufficient to effect the desired reaction. The amount of the catalyst can vary over a wide range; however, normally there is present one mole of catalyst for from about $10^2$ to about $10^8$ moles of the aliphatic unsaturated organic compound. Preferably one mole of catalyst is present for from about $10^4$ to about $10^6$ moles of the aliphatic unsaturated organic compound.

The silicon compounds contemplated for the process of this invention can be inorganic or organic, monomeric or polymeric, as long as they contain at least one silicon atom to which at least one hydrogen atom is attached in each molecule. The compound should not contain in the molecule any silicon atoms to which are attached more than two hydrogen atoms because of possible undesirable side reactions that may be encountered.

Typical inorganic monomeric compounds that are suitable as reactants for the instant process are halogen-substituted silanes such as dichlorosilane, trichlorosilane, dibromosilane, tribromosilane, and the like.

Suitable inorganic polymeric compounds are the polysilanes and polysiloxanes such as pentachlorodisilane, pentabramodisilane, pentachlorodisiloxane, pentabromodisiloxane, heptachlorotrisilane, heptabromotrisilane, and the like.

A preferred grouping of monomeric silicon compounds which are suitable for the purposes of the present invention can be represented by the formula

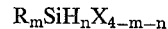

$$R_mSiH_nX_{4-m-n}$$

wherein R can be an organic radical attached to silicon through silicon-carbon linkages, X can be a halogen, an alkoxy group, or an aroxy group, $m$ has a value from 0 to 2, inclusive, $n$ has a value from 1 to 2, inclusive, and the sum of $m$ plus $n$ is not greater than 4.

R can be any organic radical, and, where more than one such radical is present, it can be the same or different. Preferred are organic radicals which are monovalent hydrocarbon radicals, monovalent halogenated hydrocarbon radicals, or cyanoalkyl radicals.

Illustrative organic radicals are the alkyl groups such as methyl, ethyl, propyl, butyl, iso-butyl, hexyl, octyl, decyl, octadecyl, and the like; the cycloalkyl groups such as cyclopropyl, cyclopentyl, cyclohexyl, cycloheptyl, and the like; haloalkyl groups such as chloromethyl, bromomethyl, chlorobutyl, chlorohexyl, and the like; the aralkyl groups such as benzyl, phenylethyl, naphthylethyl, pentylbutyl, and the like, the alkenyl groups such as vinyl, allyl, cyclohexenyl, and the like; the aryl groups such as phenyl, naphthyl, anthryl, and the like; the alkaryl groups such as tolyl, xylyl, ethylphenyl, and the like; the haloaryl groups such as chlorophenyl, dichlorophenyl, bromophenyl, chloronaphthyl, and the like; the cyanoalkyl groups such as cyanoethyl, cyanopropyl, cyanobutyl, and the like.

Illustrative of the alkoxy groups which can be attached to the silicon atom in the above formula are methoxy, ethoxy, propoxy, butoxy, pentoxy, and the like. Typical aroxy groups contemplated by this formula are phenoxy, naphthoxy, and the like.

Among the polymeric organo silicon compounds that are suitable for the present process are included compounds such as organopolysilanes, organopolysiloxanes, the polysilalkylene compounds containing groupings such as ≡SiCH₂Si≡, for example, the polysilphenylene compounds containing groups such as ≡SiC₆H₄Si≡, for example, and the organosiloxane compounds characterized by the presence of a ≡Si—N—Si≡ grouping, and the like.

The aliphatic unsaturated organic compounds that are suitable as reactants for the present process are those containing at least one carbon-to-carbon multiple bond and which are free from other functional groups reactive toward ≡SiH, i.e., primary or secondary aliphatic amino groups, aldehydo groups, and radicals having a cyano group on an unsaturated carbon atom are excepted. The aliphatic unsaturated compound can contain a single pair of carbon atoms linked by multiple bonds or the compound can contain several pairs of carbon atoms linked by multiple bonds. The compounds can be monomeric or polymeric in nature. Thus virtually all organic compounds containing olefinic or acetylenic unsaturation can be employed as reactants for the instant process.

The aliphatic unsaturated compounds above are not limited to hydrocarbons but can include halogenated derivatives thereof, oxygen-containing unsaturated compounds, sulfur analogs of the oxygen-containing unsaturated compounds, and the like. Also contemplated within the above description are organo-metallic compounds containing the requisite unsaturation.

Illustrative of the foregoing are the members of the homologous ethylene series, i.e., ethylene, propylene, butylene, and the like; the acetylene series; the diolefins and their homologues, i.e., 1,3-butadiene, and the like; the alkenynes, i.e., vinylacetylene, and the like; alicyclic compounds such as the cyclopentenes, the cyclohexenes, and the like; organosilicon compounds such as vinyltrimethylsilane, vinyltriethylsilane, polysiloxanes containing varying amounts of vinyl groups, and the like; esters of unsaturated acids containing up to about 18 carbon atoms such as methyl oleate, methyl acrylate, methyl methacrylate, and the like; esters of unsaturated alcohols such as vinyl acetate, allyl acetate, and the like; and esters of unsaturated alcohols with unsaturated acids such as allyl methacrylate, and the like.

The instant process can also be carried out with a sole reactant, in the presence of the catalyst of course, where the reactant contains the ≡SiH group and an unsaturated carbon-to-carbon bond on the same molecule. In such an event a polymeric product results. Reactants of this type are exemplified by dimethylvinylsilane, diphenylvinylsilane, methylphenylvinylsilane, dimethylallylsilane, and the like.

The process of this invention can be carried out by mixing all of the reactants and the catalyst together in a suitable reaction vessel, or it can be carried out by an incremental addition of one of the reactants to a reaction vessel containing the other reactant and the catalyst, or by an incremental addition of one of the reactants and the catalyst to a reaction vessel containing the other reactant.

The process can be carried out with or without a solvent depending on the fluidity and the solubility of the reactants and of the reaction products. Since the catalyst usually is present in relatively small quantities, it is often convenient to dissolve the catalyst in a suitable solvent which is inert to the reactants, catalyst, and the reaction products, such as toluene or xylene, prior to the addition to the reaction mass. Solvent can also be employed sometimes to aid in the removal of heat generated during the reaction.

Process temperatures can vary over a wide range, the maximum temperature being principally determined by the thermal stability of the reactants, the catalyst, and the reaction products. A process temperature in the range from about 0° C. to about 175° C. is preferred.

The reaction time is dependent on process temperature, the nature of the reactants, and the concentration of the catalyst. The reaction is usually complete within one hour or less; however, a time period of several hours, or more, is sometimes necessary.

The platinum (II) complexes which function as catalyst for the instant process are easy to prepare, are sufficiently soluble in hydrocarbon solvents at reaction temperatures to permit catalytic activity, and are quite stable.

The preparation of an aryl nitrile-platinum (II) halide complex is illustrated by the preparation of the benzonitrile complex as described by Ramberg, Berichte, vol. 40, p. 2578 (1907). Another method of preparation involves the heating of a platinum (II) halide with the desired nitrile compound.

The process of this invention is further illustrated by the following examples.

EXAMPLE I

To a mixture of 3-hydroheptamethyltrisiloxane (about 22.2 parts by weight, 3-vinylheptamethyltrisiloxane (about 24.9 parts by weight) and toluene (about 32 parts by weight), contained in a suitable reaction vessel was added about one part by weight of a toluene solution containing bis(benzonitrile)dichloroplatinum (II) (about 0.0012 part by weight).

The resulting admixture was then heated to about 119° C. and maintained at this temperature for about 3.5 hours. The contents of the reaction vessel was then distilled and about 41 parts by weight of a distillate boiling in the range from about 92.0° C. to about 92.5° C. at about 0.21 mm. of Hg was collected. The index of refraction of the distillate: $n_D^{25}=1.404$. The distillate was identified as an addition product having the chemical formula $C_{16}H_{46}O_4Si_6$, obtained in 87% yield.

*Analysis.*—Calc'd: C, 40.8%; H, 9.8%; Si, 35.8%. Found: C, 40.6%; H, 9.8%; Si, 34.0%.

EXAMPLE II

To a mixture of 3-hydroheptamethyltrisiloxane (about 18.2 parts by weight) and triethylene glycol allyl methyl ether (about 20.2 parts by weight, 20% excess) maintained at about 23° C. in a suitable reaction vessel was added about two parts by weight of a toluene solution containing bis(benzonitrile)dichloroplatinum (II) (about 0.0023 part by weight).

In the resulting admixture an exothermic reaction started within about 20 minutes with the temperature reaching a maximum of about 92.5° C. after about 35 minutes.

After the reaction had subsided, the contents of the reaction vessel was distilled and about 35 parts by weight of a distillate boiling in the range from about 124° C. to about 125° C. at 0.08 mm. Hg was obtained. The index of refraction of the distillate: $n_D^{25}=1.424$. The distillate was identified as an addition product having the chemical formula $C_{17}H_{42}O_6Si_3$, obtained in 83% yield.

*Analysis.*—Calc'd: C, 47.9%; H, 9.9%; Si, 19.8%. Found: C, 48.1%; H, 9.7%; Si, 19.4%.

EXAMPLE III

A mixture of 3-hydroheptamethyltrisiloxane (about 38.9 parts by weight), toluene (about 30.8 parts by weight), and bis(benzonitrile)dichloroplatinum (II) was placed in a suitable reaction vessel. Dropwise to this mixture was added styrene (about 27 parts by weight) while external heat was applied. An exothermic reaction commenced at about 61° C. Thereafter external heating was stopped, and reaction temperature rose to a maximum of about 113° C. Subsequently heating was resumed until reflux conditions took place at about 130° C. The total reaction time was about 37 minutes.

Thereafter the contents of the reaction vessel was distilled and about 49.1 parts by weight of a distillate boiling in the range from about 69° C. to about 75° C. at 0.021 mm. of Hg was obtained. The distillate was identified as an addition product having the chemical formula $C_{15}H_{30}O_2Si_3$, obtained in 86% yield. The index of refraction of the distillate: $n_D^{25}=1.448$.

*Analysis.*—Calc'd: C, 55.2%; H, 9.3%; Si, 25.8%. Found: C, 54.8%; H, 9.5%; Si, 26.0%.

EXAMPLE IV

To a mixture of allyl cyanide (about 23.3 parts by weight, 20% excess), toluene (about 3 parts by weight), and bis(benzonitrile)dichloroplatinum (II) (about 0.0034 part by weight) contained in a suitable reaction vessel was added dropwise methyldichlorosilane (about 33.4 parts by weight) while external heat was applied to the resulting admixture. An exothermic reaction took place at about 97° C.

Thereafter external heating was discontinued and the reaction temperature maintained in the range from about 117° C. to about 121° C. by regulating the rate of addition of the methyldichlorosilane. External heating was resumed when the temperature in the reaction vessel fell to about 115° C. and was continued until the temperature reached about 151° C. Total reaction time was about 72 minutes.

The contents of the reaction vessel was then distilled and about 47 parts by weight of a distillate having a boiling point in the range from about 53° C. to about 54° C. at 0.074 mm. of Hg was obtained. The distillate was identified as an addition product having the chemical formula $C_5HCl_2NSi$, obtained in 89% yield. The index of refraction of the distillate: $n_D^{25}=1.455$.

*Analysis.*—Calc'd: C, 33.0%; H, 5.0%; Cl, 38.9%; N, 7.7%; Si, 15.4%. Found: C, 33.3%; H, 5.3%; Cl, 38.6%; N, 7.7%; Si, 15.2%.

EXAMPLE V

Potassium chloroplatinite, $K_2PtCl_4$ (about 4.2 parts by weight) and acetonitrile (about 1.7 parts by weight) were dissolved in water (about 25 parts by weight) contained in a suitable reaction vessel. The resulting solution was heated to reflux, while being stirred, and was maintained at refluxing temperature for about two hours. During this time a yellowish precipitate was formed.

The precipitate was recovered from the reaction mass by filtration and washed three times with distilled water, two times with ethanol, and three times with ethyl ether in that order. The precipitate was then dried overnight in a desiccator.

The thus obtained precipitate was in the form of pale, greenish-yellow crystals which are identified as bis(acetonitrile) dichloroplatinum (II) obtained in a 68 percent yield.

*Analysis.*—Calc'd: Cl, 20.4%; N, 8.05%; Pt., 56.0%. Found: Cl, 20.2%; N, 8.4%; Pt., 55.7%.

EXAMPLE VI

To a mixture of 3-hydroheptamethyltrisiloxane (about 15 parts by weight) and 3-vinylheptamethyltrisiloxane (about 16.8 parts by weight) contained in a suitable reaction vessel was added bis(acetonitrile) dichloroplatinum (II) (about 0.0029 part by weight) suspended in toluene (about 8.7 parts by weight).

The resulting admixture was then heated, while stirring, to a temperature of about 130° C. At this temperature a vigorous reflux, indicative of an exothermic reaction, occurred and subsequently subsided. Heating was continued until the temperature reached 136° C. The total time period during which heat was applied to the above reaction mixture was about 32 minutes.

Thereafter the contents of the reaction vessel was distilled and about 26.5 parts by weight, based on the reaction mixture, of a distillate boiling at a temperature in the range from about 71.0° C. to about 73.0° C. at about 0.0075 to about 0.0080 mm. of Hg was obtained. The distillate was identified as an addition product having the chemical formula $C_{16}H_{46}O_4Si_6$, obtained in 83 percent yield.

*Analysis.*—Calc'd: C, 40.8%; H, 9.8%; Si, 35.8%. Found: C, 40.3%; H, 9.6%; Si, 35.1%.

EXAMPLE VII

Platinum (II) chloride, $PtCl_2$ (about 2 parts by weight) and 4-chlorobenzonitrile (about 5 parts by weight) were admixed in a reaction vessel and the mixture stirred for about two hours at a temperature of about 140° C. to about 150° C. The resulting product was dissolved in acetone (about 300 milliliters) and filtered. Thereafter the solution was evaporated to about one half of the original volume thereby bringing about crystallization of the product. After cooling the solution to room temperature the crystals were separated out by filtration. The crystals were washed thoroughly with ethyl ether and then dried in a desiccator. Based on the total reaction mixture about 2.8 parts by weight crystals were obtained. The crystals were identified as bis(4-chlorobenzonitrile)dichloroplatinum (II) obtained in 69 percent yield.

EXAMPLE VIII

A mixture of 3-hydroheptamethyltrisiloxane (about 35 parts by weight) and toluene (about 4.7 parts by weight) was placed in a suitable reaction vessel. To the resulting admixture was added about 3.1 parts by weight of a toluene solution of bis(4-chlorobenzonitrile)dichloroplatinum (II) (about 0.0036 part by weight). Thereafter styrene (about 16.4 parts by weight) was added dropwise, and heat was applied externally. External heating was stopped when an exothermic reaction was observed (at about 63° C.). Because of the exothermic reaction the temperature of the reaction mass was observed to rise to about 116° C. At this time external heating was again commenced and continued until the reaction mass reached a temperature of about 129° C. The total reaction time was about 35 minutes.

The contents of the reaction vessel was then distilled, and about 41.6 parts by weight of a distillate boiling in the range from about 72.0° C. to about 75.0° C. at about 0.011 to about 0.030 mm. of Hg was obtained. The distillate was identified as an addition product having the chemical formula $C_{15}H_{30}O_2Si_3$, obtained in 81 percent yield.

*Analysis.*—Calc'd: C, 55.2%; H, 9.3%; Si, 25.8%. Found: C, 54.8%; H, 9.1%; Si, 25.7%.

EXAMPLE IX

Platinum (II) chloride, $PtCl_2$ (about parts by weight), lauronitrile (about 4.1 parts by weight), and xylene (about 10 milliliters) were combined, heated, and maintained at reflux conditions for about three hours. During this time the resulting admixture was vigorously stirred.

Thereafter the admixture was filtered while hot, and the thus obtained filtrate cooled in an ice bath so as to promote crystallization. The resulting crystallized product was separated by filtration from the mother liquor and washed several times with ethanol and then with ethyl ether. The crystallized product was then dried for about 3 hours at about 70° to 80° C. in a vacuum oven. About 1.6 parts by weight of a straw colored powder were obtained. This powder was identified as bis(lauronitrile) dichloroplatinum (II) $[CH_3(CH_2)_{10}CN]_2PtCl_2$, obtained in about 40 percent yield.

*Analysis.*—Calc'd: C, 45.8%; H, 7.38%; Cl, 11.3%; N, 4.46%; Pt, 31.0%. Found: C, 45.7%; H, 7.5%; Cl, 11.1%; N, 4.5%; Pt, 30.8%.

EXAMPLE X

Trichlorosilane (about 65 parts by weight) was placed in a suitable reaction vessel and thereafter about 6.4 parts by weight of a xylene solution containing bis(lauronitrile) dichloroplatinum (II) (about 0.0074 part by weight) was added thereto. After the addition of the xylene solution styrene (about 50 parts by weight) was added dropwise, and heat was externally applied.

An exothermic reaction was observed to commence at about 41° C. at which time external heating was stopped. The reaction temperature rose to a maximum of about 131° C. The total reaction time was about 44 minutes.

The contents of the reaction vessel was then distilled, and about 98.4 parts by weight of a distillate boiling in the range from about 113.5° C. to about 116.5° C. at about 7 mm. of Hg was obtained. The distillate was identified as a product having the chemical formula $C_8H_9Cl_3Si$, obtained in 86% yield.

*Analysis.*—Calc'd: C, 40.1%; H, 3.79%; Cl, 44.4%; Si, 11.7%. Found: C, 40.0%; H, 4.0%; Cl, 45.0%; Si, 12.0%.

The foregoing discussion and the examples are intended as illustrative. Still other variations and modifications of the process of this invention will readily present themselves to the skilled artisan without a departure from the spirit and scope thereof.

I claim:

1. A process for the production of organosilicon compounds containing silicon-carbon bonds which comprises contacting a silicon compound containing at least one hydrogen atom attached to a silicon atom per molecule, but no more than two hydrogen atoms being attached to any silicon atom in the molecule, with an aliphatic organic compound having carbon-to-carbon unsaturation but free from other functional groups reactive toward $\equiv$SiH, in the presence of catalytic amounts of a platinum (II) complex which is a member of the group consisting of an aryl nitrile-platinum (II) halide complex, an alkyl nitrile-platinum (II) halide complex, an alkaryl nitrile-platinum (II) halide complex, an aralkyl nitrile-platinum (II) halide complex, and a haloaryl nitrile-platinum (II) halide complex, for a time period sufficient to form a silicon-carbon bond.

2. A process for the production of organosilicon compounds containing silicon-carbon bonds which comprises contacting a partially substituted silane represented by the formula $$R_mSiH_nX_{4-m-n}$$

wherein R is an organic radical attached to silicon through silicon-carbon linkages, X is a member of the group consisting of a halogen, an alkoxy group, and an aroxy group, m has a value from 0 to 2, inclusive, n has a value from 1 to 2, inclusive, and the sum of m plus n is not greater than 4, with an aliphatic organic compound having carbon-to-carbon unsaturation but free from other functional groups reactive toward $\equiv$SiH, in the presence of catalytic amounts of a platinum (II) complex which is a member of the group consisting of an aryl nitrile-platinum (II) halide complex, an alkyl nitrile-platinum (II) halide complex, an alkaryl nitrile-platinum (II) halide complex, an aralkyl nitrile-platinum (II) halide complex, and a haloaryl nitrile-platinum (II) halide complex, for a time period sufficient to form a silicon-carbon bond.

3. The process in accordance with claim 2 wherein the platinum (II) complex is an aryl nitrile-platinum (II) chloride complex.

4. The process in accordance with claim 2 wherein the platinum (II) complex is bis(benzonitrile)dichloroplatinum (II).

5. The process in accordance with claim 2 wherein the platinum (II) complex is bis(acetonitrile)dichloroplatinum (II).

6. The process in accordance with claim 2 wherein the platinum (II) complex is bis(4-chlorobenzonitrile) dichloroplatinum (II).

7. The process in accordance with claim 2 wherein the platinum (II) complex is bis(lauronitrile)dichloroplatinum (II).

8. A process for the production of organosilicon compounds containing silicon-carbon bonds which comprises contacting partially substituted silane represented by the formula $$R_mSiH_nX_{4-m-n}$$

wherein R is an organic radical attached to silicon through silicon-carbon linkages, X is a member of the group consisting of a halogen, an alkoxy group, and an aroxy group, m has a value from 0 to 2, inclusive, n has a value from 1 to 2, inclusive, and the sum of m plus n is not greater than 4, with an aliphatic organic compound having carbon-to-carbon unsaturation but free from other functional groups reactive toward $\equiv$SiH, and in the presence of a platinum (II) complex catalyst in a ratio of 1 mole of the catalyst to about $10^4$ to $10^6$ moles of the unsaturated organic compound at a temperature in the range from about 0° C. to about 175° C., and for a sufficient time to form a silicon-carbon bond; said catalyst being a member of the group consisting of an aryl nitrile-platinum (II) halide complex, an alkyl nitrile-platinum (II) halide complex, an alkaryl nitrile-platinum (II) halide complex, an aralkyl nitrile-platinum (II) halide complex, and a haloaryl nitrile-platinum (II) halide complex.

References Cited

UNITED STATES PATENTS

| | | | |
|---|---|---|---|
| 2,970,150 | 1/1961 | Bailey | 260—448.2 X |
| 3,153,662 | 10/1964 | Pike | 260—448.2 |
| 3,220,972 | 11/1965 | Lamoreaux | 260—448.2 X |
| 2,823,218 | 2/1958 | Speier et al. | 260—448.2 |
| 3,322,808 | 5/1967 | Koerner | 260—448.2 |
| 3,159,601 | 12/1964 | Ashby. | |
| 3,159,661 | 12/1964 | Ashby. | |
| 3,159,662 | 12/1964 | Ashby. | |
| 3,167,573 | 1/1965 | Nitzsche. | |
| 3,188,299 | 6/1965 | Chalk. | |
| 3,188,300 | 6/1965 | Chalk. | |

TOBIAS E. LEVOW, *Primary Examiner.*

P. F. SHAVER, *Assistant Examiner.*